(12) United States Patent
Murthy et al.

(10) Patent No.: US 10,210,221 B2
(45) Date of Patent: *Feb. 19, 2019

(54) SYSTEM AND METHOD FOR DISTRIBUTED DATABASE QUERY ENGINES

(71) Applicant: Facebook, Inc., Menlo Park, CA (US)

(72) Inventors: Raghotham Murthy, San Francisco, CA (US); Rajat Goel, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 377 days.

This patent is subject to a terminal disclaimer.

(21) Appl. No.: 15/064,559

(22) Filed: Mar. 8, 2016

(65) Prior Publication Data

US 2016/0188677 A1 Jun. 30, 2016

Related U.S. Application Data

(63) Continuation of application No. 14/728,966, filed on Jun. 2, 2015, now Pat. No. 9,361,344, which is a
(Continued)

(51) Int. Cl.
*G06F 17/30* (2006.01)

(52) U.S. Cl.
CPC .... *G06F 17/30545* (2013.01); *G06F 17/3048* (2013.01); *G06F 17/30368* (2013.01);
(Continued)

(58) Field of Classification Search
CPC ............... G06F 17/30545; G06F 17/30283
See application file for complete search history.

(56) References Cited

U.S. PATENT DOCUMENTS

| 5,987,449 A | 11/1999 | Suciu |
| 6,922,791 B2 | 7/2005 | Mashayekhi et al. |

(Continued)

FOREIGN PATENT DOCUMENTS

| CN | 101067823 A | 11/2007 |
| CN | 101093501 A | 12/2007 |

(Continued)

OTHER PUBLICATIONS

Hellerstein et al. "Online Aggregation", 1997, ACM 0-89791-911-4/97/0005, pp. 171-182 (Year: 1997).*

(Continued)

*Primary Examiner* — Alexander Khong
(74) *Attorney, Agent, or Firm* — FisherBroyles, LLP

(57) ABSTRACT

Techniques for a system capable of performing low-latency database query processing are disclosed herein. The system includes a gateway server and a plurality of worker nodes. The gateway server is configured to divide a database query, for a database containing data stored in a distributed storage cluster having a plurality of data nodes, into a plurality of partial queries and construct a query result based on a plurality of intermediate results. Each worker node of the plurality of worker nodes is configured to process a respective partial query of the plurality of partial queries by scanning data related to the respective partial query that stored on at least one data node of the distributed storage cluster and generate an intermediate result of the plurality of intermediate results that is stored in a memory of that worker node.

18 Claims, 7 Drawing Sheets

Related U.S. Application Data continuation of application No. 13/735,820, filed on Jan. 7, 2013, now Pat. No. 9,081,826.

(52) U.S. Cl.
CPC .. *G06F 17/30457* (2013.01); *G06F 17/30864* (2013.01); *G06F 17/30867* (2013.01)

(56) References Cited

U.S. PATENT DOCUMENTS

| | | | |
|---|---|---|---|
| 7,984,043 B1* | 7/2011 | Waas | G06F 17/30932 |
| | | | 707/718 |
| 9,081,826 B2 | 7/2015 | Raghotham et al. | |
| 9,361,344 B2 | 6/2016 | Murthy et al. | |
| 2003/0074352 A1 | 4/2003 | Raboczi et al. | |
| 2004/0103087 A1* | 5/2004 | Mukherjee | G06F 17/30864 |
| 2011/0082859 A1 | 4/2011 | Deng et al. | |
| 2011/0228668 A1* | 9/2011 | Pillai | G06F 11/2023 |
| | | | 370/217 |
| 2012/0054182 A1* | 3/2012 | Gupta | G06F 17/30445 |
| | | | 707/737 |
| 2014/0067792 A1* | 3/2014 | Erdogan | G06F 17/30575 |
| | | | 707/718 |
| 2014/0195558 A1 | 7/2014 | Murthy et al. | |
| 2015/0261831 A1 | 9/2015 | Raghotham et al. | |

FOREIGN PATENT DOCUMENTS

| | | |
|---|---|---|
| JP | 2001312504 A | 11/2001 |
| JP | 2002108670 A | 4/2002 |
| JP | 2002108899 A | 4/2002 |
| WO | 2005076160 A1 | 8/2005 |

OTHER PUBLICATIONS

Office Action dated Dec. 6, 2016 in Japanese Patent Application No. 2015-551711 filed Dec. 20, 2013, 6 pages with English translation.
Notice of Allowance dated May 30, 2017 in Korean Patent Application No. 10-2015-7020768, filed Dec. 20, 2013, 3 pages.
Notice of Preliminary Rejection dated Jan. 19, 2017 in Korean Patent Application No. 10-2015-7020768, filed Dec. 20, 2013, 9 pages.
Abouzeid, A. et al., "HadoopDB: An Arcitectural Hybrid of MapReduce and DBMS Technologies for Analytical Workloads," VLDB, '09, Aug. 24-28, 2009, 12 pages.
Condie, T., et al., "MapReduce Online," NSDI '10 Proceedings of the 7th Usenix Conference, in NSDI, vol. 10, No. 4, 15 pages, 2010.
Condie, T., et al., "Online aggregation and continuous query support in MapReduce," Proceedings of the 2010 Interational Conference on Management of Data, SIFMOD '10, pp. 1115-1118, 2010.
Hellerstein et al., "Online Aggregation", 1997, ACM 0-89791-911-4/97/0005, pp. 171-182.
Sadalage, P.J., et al., "NOSQL Distilled: A Brief Guide to the Emerging World of Polyglot Persistence," Pearson Education, Chapter 7, pp. 67-78, 2012.
Extended European Search Report dated Jan. 19, 2015 for European Application No. 13198563.2 filed Dec. 19, 2013, pp. 1-8.
Intention to Grant Communication dated Feb. 4, 2016, for European Application No. 13198563.2 filed Dec. 19, 2013, 7 pages.
International Search Report and Written Opinion dated Mar. 26, 2014, for International Patent Application No. PCT/US2013/077240 filed Dec. 20, 2013, pp. 1-14.
Non-Final Office Action dated Jul. 1, 2015, for U.S. Appl. No. 14/728,966 by Murthy, R.S. et al., filed Jun. 2, 2015.
Notice of Allowance dated Feb. 1, 2016, for U.S. Appl. No. 14/728,966 by Murthy, R.S. et al., filed Jun. 2, 2015.
Non-Final Office Action dated Nov. 14, 2014 for U.S. Appl. No. 13/735,820, filed Jan. 7, 2013.
Notice of Allowance dated Apr. 20, 2015, for U.S. Appl. No. 13/735,820, filed Jan. 7, 2013.
Notice of Allowance dated May 11, 2015, for U.S. Appl. No. 13/735,820, filed Jan. 7, 2013.
First Patent Examination Report dated Aug. 5, 2016, for Australian Application No. 2013371448, filed Dec. 20, 2013, 2 pages.
European Patent Office Communication pursuant to Article 94(3) EPC dated Nov. 17, 2017 for European Patent Application No. 16176465.9-1952 of Facebook, Inc.
Notice of Allowance dated May 24, 2017 for Mexican Patent Application No. MX/a/2015/008799 of Facebook Inc.
Steveloughran "JobTracker—Hadoop Wiki" Jun. 30, 2010, XP055423567. Retrieved from the Internet: https://wiki.apache.org/hadoop/JobTracker?action=recall&rev=3.
Extended European Search Report dated Aug. 16, 2016 for European Application No. 16176465.9 filed Dec. 19, 2013, 10 pages.
U.S. Appl. No. 13/735,820 by Murthy, R.S. et al., filed Jan. 7, 2013.
U.S. Appl. No. 14/728,966 by Murthy, R.S. et al., filed Jun. 2, 2015.
Office Action dated Mar. 14, 2017 in Mexican Patent Application No. MX/a/2015/008799, filed Dec. 20, 2013, 2 pages.
Notification to Grant Patent Right for Invention received in Chinese Application No. 201380069759.9, dated Sep. 27, 2018, 3 pages (inculding English Translation).
Communication under Rule 71(3) EPC received in European Patent Application No. 16176465.9, dated Sep. 28, 2018, 83 pages.

* cited by examiner

SYSTEM AND METHOD FOR DISTRIBUTED DATABASE QUERY ENGINES

CLAIM OF PRIORITY

This application is a Continuation of U.S. patent application Ser. No. 14/728,966, entitled "SYSTEM AND METHOD FOR DISTRIBUTED DATABASE QUERY ENGINES," filed Jun. 2, 2015, which is a Continuation of U.S. patent application Ser. No. 13/735,820 entitled "SYSTEM AND METHOD FOR DISTRIBUTED DATABASE QUERY ENGINES," filed Jan. 7, 2013, now issued as U.S. Pat. No. 9,081,826 on Jul. 14, 2015, the entire content of which are expressly incorporated herein by reference.

FIELD OF THE INVENTION

This invention relates generally to databases, and in particular to a distributed database query engine for low query latency database analyses.

BACKGROUND

Developments in computer and networking technology have given rise to applications that require massive amounts of data storage. For example, tens of millions of users can create web pages and upload images and text to a social media website. Consequently, a social media website can accumulate massive amounts of data each day and therefore need a highly scalable system for storing and processing data. Various tools exist to facilitate such mass data storage.

Frameworks exist that support large-scale data-intensive distributed applications, by enabling applications to interact with a cluster of thousands of computers (also referred to as nodes) and petabytes of data. For instance, a framework called Hadoop utilizes a distributed, scalable, portable file system, called Hadoop Distributed File System (HDFS), to distribute a massive amount of data among data nodes (also referred to as slave nodes) in a Hadoop cluster. In order to reduce the adverse impact of a data node power outage or network failure (including switch failure), data in an HDFS is typically replicated on different data nodes.

Hive, an open source data warehouse system, was developed to run on top of Hadoop clusters. Hive supports data queries expressed in a scripted query language (SQL)-like declarative language called HiveQL. The Hive system then compiles the queries expressed in HiveQL into map-reduce jobs that can be executed on the Hadoop cluster, in a mathematical form of directed acyclic graph. The HiveQL language includes a type system that supports tables containing primitive types, collections such as arrays and maps, and nested compositions of types. In addition, the Hive system includes a system catalog, called Hive-Metastore, containing schemes and statistics, which is useful in data exploration and query optimization.

Coupled with the Hadoop cluster, the Hive system can store and analyze large amounts of data for a social networking system. For example, the Hive system can analyze the degree of connection between users to rank stories that users follow on the social networking system. The Hive system can analyze activity logs to gain insights into how services of the social networking system are being used to help application developers, page administrators and advertisers make development and business decisions. The Hive system can run complex data mining programs to optimize the advertisements shown to the users of the social networking system. The Hive system can further analyze the usage logs to identify spam and abuse of the social networking system.

The Hive system includes web-based tools for people without programming ability to author and execute Hive queries, for authoring, debugging and scheduling complex data pipelines, and for generating reports based on data stored in the Hive system and other relational databases like MySQL and Oracle.

However, query latency for the Hive system is usually high. Due to the large amount of data and the map-reduce scheme of the Hadoop cluster, even a simplest query can take from several seconds to minutes to complete. This is particular a problem for interactive analyses when an operator needs the result of the current query to decide the next query of a series of queries. The latency problem significantly affects the productivity of the analysts since the analysts cannot determine the next query when waiting for the result of the current query.

One possible workaround solution is to create data pipelines that load aggregate data from Hive into other type of relational database management system (RDBMS) such as MySQL and Oracle. Then the operator performs interactive analysis and builds reports using these RDBMS. However, each RDBMS needs a separate data pipeline. It also takes time for the data pipeline to transfer the aggregate data from Hive to other RDBMS. Thus, this workaround process is still cumbersome and inconvenient.

SUMMARY

The technology introduced here provides the benefits of low-latency queries on a very large amount of data stored in a large scale storage cluster (e.g. a Hadoop cluster), which stores metadata in a system catalog (e.g. Hive Metastore). In particular, the technology introduced here includes a distributed query engine based on a serving tree computation framework. The distributed query engine includes a gateway server and a plurality of work nodes. The gateway server divides a query task into partial tasks. Each worker node of the engine handles a partial task to generate an intermediate query result in memory. The intermediate query result can be an approximate intermediate result generated by scanning a portion of the related data. The gateway server receives the intermediate query results and constructs a query result for the query task based on the intermediate query results.

In accordance with the techniques introduced here, therefore, a system for processing a database query for a database is provided. The system includes a gateway server and a plurality of worker nodes. The gateway server is configured to divide the database query, for the database containing data stored in a distributed storage cluster having a plurality of data nodes, into a plurality of partial queries and construct a query result based on a plurality of intermediate results. Each worker node of the plurality of worker nodes is configured to process a respective partial query of the plurality of partial queries by scanning data related to the respective partial query that stored on at least one data node of the distributed storage cluster and generate an intermediate result of the plurality of intermediate results that is stored in a memory of that worker node.

The techniques introduced here are capable of performing low-latency query processing on a large aggregate of data stored in a large scale storage cluster such as a Hadoop cluster. This is particularly beneficial for interactive analyses since operators do not need to wait for the current query to complete to determine the next query. This distributed query system can further generate approximate results by scanning a portion of the related data. Operators of the system can receive rapid prototyping of a series of queries to test the validity of the series the queries, before processing the series of queries on the whole set of the related data.

Other aspects of the technology introduced here will be apparent from the accompanying figures and from the detailed description, which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this description to "an embodiment", "one embodiment", or the like, mean that the particular feature, function, or characteristic being described is included in at least one embodiment of the present invention. Occurrences of such phrases in this description do not necessarily all refer to the same embodiment, nor are they necessarily mutually exclusive.

Modern social networking systems can accumulate massive amounts of data each day and therefore need a highly scalable system for storing and analyzing data. Particularly, efficient interactive analyses on the massive amount of data need a low-latency fast-responding way of processing data queries. The present invention discloses a distributed query engine enabled by combining an in-memory serving-tree based computation framework with approximate query processing. The distributed query engine divides a query task into multiple partial tasks and distributes the partial tasks to worker nodes for further in-memory processing. The distributed query engine is capable of generating an approximate result at any time during the query processing, by requesting approximate intermediate results from the worker nodes based on the scanned portion of the data. Unlike the map-reduce scheme of the conventional Hadoop clusters, the worker nodes process the partial tasks and store the entire intermediate results in memory to reduce the processing time and improve overall latency. Only the intermediate results, instead of the underlying date, are transferred for the construction of the result, significantly reducing the amount of transferred data and the transferring time.

In one embodiment, the distributed query engine can be built on top of a Hadoop cluster running Hadoop Distributed File System (HDFS), Hive data warehouse, and Hive-Metastore. The distributed query engine can be compatible with Hive's data formats and metadata, and support a subset of HiveQL language. Operators using the distributed query engine can efficiently discover statistics patterns in the data managed by the Hive data warehouse. The distributed query engine can conduct quick analyses and rapid prototyping of a series of queries by generating approximate results. In addition, the distributed query engine can run full analyses by scanning the entire related data aggregate.

Figure 1:
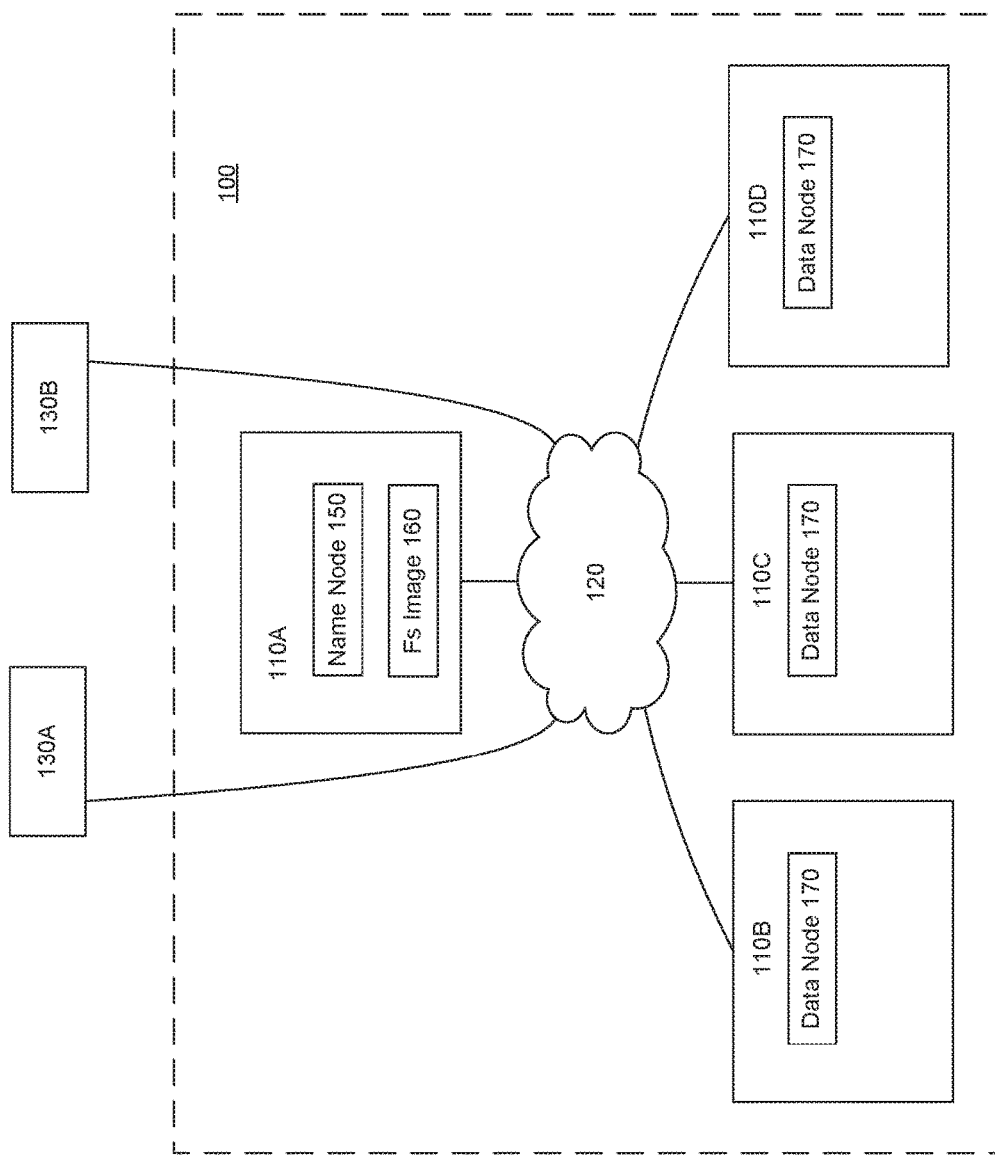
FIG. 1 illustrates an example of a Hadoop cluster upon which a distributed query engine can be built.

FIG. 1 illustrates an example of a Hadoop cluster that a distributed query engine can be built upon. In FIG. 1, the Hadoop cluster 100 includes a metadata node 110A and a plurality of data nodes 110B, 110C and 110D. The nodes can communicate with each other through an interconnect 120. The interconnect 120 may be, for example, a local area network (LAN), wide area network (WAN), metropolitan area network (MAN), global area network such as the Internet, a Fibre Channel fabric, or any combination of such interconnects. In some embodiments, the interconnect 120 can include a network switch for processing and routing data between the nodes under network protocols, including TCP/IP. Clients 130A and 130B may communicate with the Hadoop cluster 100 via a network 140, which can be, for example, the Internet, a LAN, or any other type of network or combination of networks. Each of the clients may be, for example, a conventional personal computer (PC), server-class computer, workstation, handheld computing/communication device, or the like. In some embodiments, the Hadoop cluster is implemented using one or more racks of commodity-class servers.

Files and data are stored in a distributed manner across the nodes in the Hadoop cluster 100 in a Hadoop Distributed File System (HDFS). To the clients of the cluster 100, including clients 130A and 130B, the HDFS serves the functions of a conventional hierarchical file system. Files and data blocks of files can be created, deleted, or moved in the HDFS. There is a NameNode service 150 running on the metadata node 110A to provide metadata services within HDFS, including maintaining the file system namespace and controlling access by external clients. The NameNode service can store the file system index, including the mapping of blocks to files and file system properties, in a file 160 called FsImage in the metadata node. In some embodiments, there may be a secondary metadata node running a secondary NameNode service. The secondary metadata node serves as a backup in case the metadata node fails.

Each data node 110 is responsible for storing files for the HDFS. Files stored in the HDFS are divided into subsets, referred to herein as "blocks". In one embodiment, the size of a block is 64 MBs. The blocks are typically replicated to multiple data nodes. Therefore, the HDFS in the Hadoop cluster 100 can, but does not necessarily, use a conventional RAID architecture to achieve data reliability. File operations are controlled by the NameNode service 150 running on the metadata node 110A. In some embodiments, data nodes 110B, 110C, 110D are organized into racks where all nodes are connected via a network switch. The network speed between nodes within a rack can be faster than the network speed between nodes in different racks. The Hadoop cluster may take that fact into account when assigning tasks. A DataNode service 170 runs on each data node for responding read and write requests for blocks. The DataNode services 170 also respond to requests from the metadata node for creating, deleting and replicating blocks.

In some embodiments, the data nodes 110B, 110C, 110D send periodic heartbeat messages including block reports to the metadata node 110A. The metadata node 110A validates its block mapping and other file system metadata using the periodic block reports.

When a client 130A or 130B seeks to write a file to the Hadoop cluster 100, the client sends a file creation request to the metadata node 110A. The metadata node 110A responds to the client with the identity of one or more assigned data node(s) and the destination locations of the blocks of the files. The client sends data blocks of the file to the assigned data node(s); and the cluster can replicate the data blocks on one or more data nodes. Once all blocks are sent, the metadata node records the file creation in its metadata, including the FsImage file.

Figure 2:
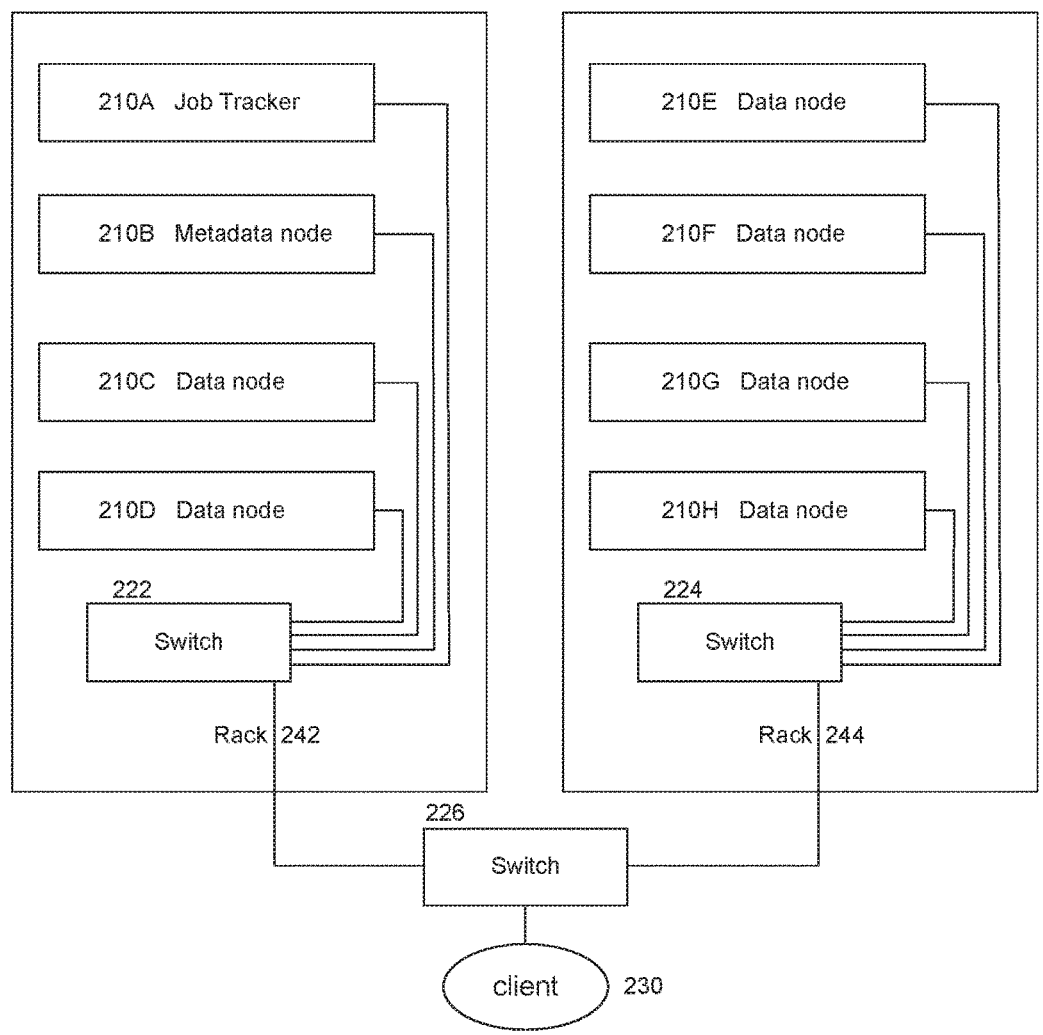
FIG. 2 illustrates an example of a Hadoop cluster having a JobTracker managing a MapReduce task.

A Hadoop cluster works as a parallel data processing engine based on a framework called MapReduce. The Hadoop cluster includes a JobTracker to implement the MapReduce function. As illustrated in FIG. 2, a JobTracker can be implemented as a dedicated server (JobTracker node 210A) within a Hadoop cluster 200. The Hadoop cluster 200 includes two racks 242 and 244 interconnected via a switch 226. Rack 242 includes JobTracker node 210A, metadata node 210B, data nodes 210C-210D and a switch 222 to interconnect the nodes within rack 242. Rack 244 includes data nodes 210E-210H and a switch 224 to interconnect the nodes within rack 242. In some other embodiments, a JobTracker can be implemented as a service that shares the same metadata node with a NameNode service. The metadata node 210B (also referred to as name node) runs the NameNode service to track where across the cluster the data is kept. The JobTracker node 210A, which is dedicated to control MapReduce jobs, receives a request from a client 230 to launch a MapReduce job. Once the MapReduce job (also referred to as a MapReduce application or a MapReduce task) is submitted to the JobTracker 210A, JobTracker 210A identifies input and output files and/or directories in the HDFS for the job. The input file for the MapReduce task can include a plurality of input file blocks that contain input data for the MapReduce task. The JobTracker 210A uses knowledge of the input file blocks (including physical quantity of blocks and where the blocks are located) to decide how many subordinate tasks will be created. The MapReduce application is copied to every processing node where the input file blocks are present. For each assigned processing node, JobTracker 210A creates at least one subordinate task. On each assigned processing node, a TaskTracker service monitors the status of the subordinate task on that node and reports the status and intermediate output back to the JobTracker. The Hadoop cluster 200 distributes the subordinate tasks based on the knowledge of the file blocks. Therefore, instead of moving storage to the processing locations, a Hadoop cluster moves the processing tasks to the storage locations.

Although the nodes 210A-210H are illustrated as single units in FIG. 2, each node can have a distributed architecture. For example, a node can be designed as a combination of multiple computers, which may be physically separate from each other and which may communicate with each other over a physical interconnect. Such an architecture allows convenient scaling, such as by deploying computers capable of communicating with each other through the interconnect.

Figure 3:
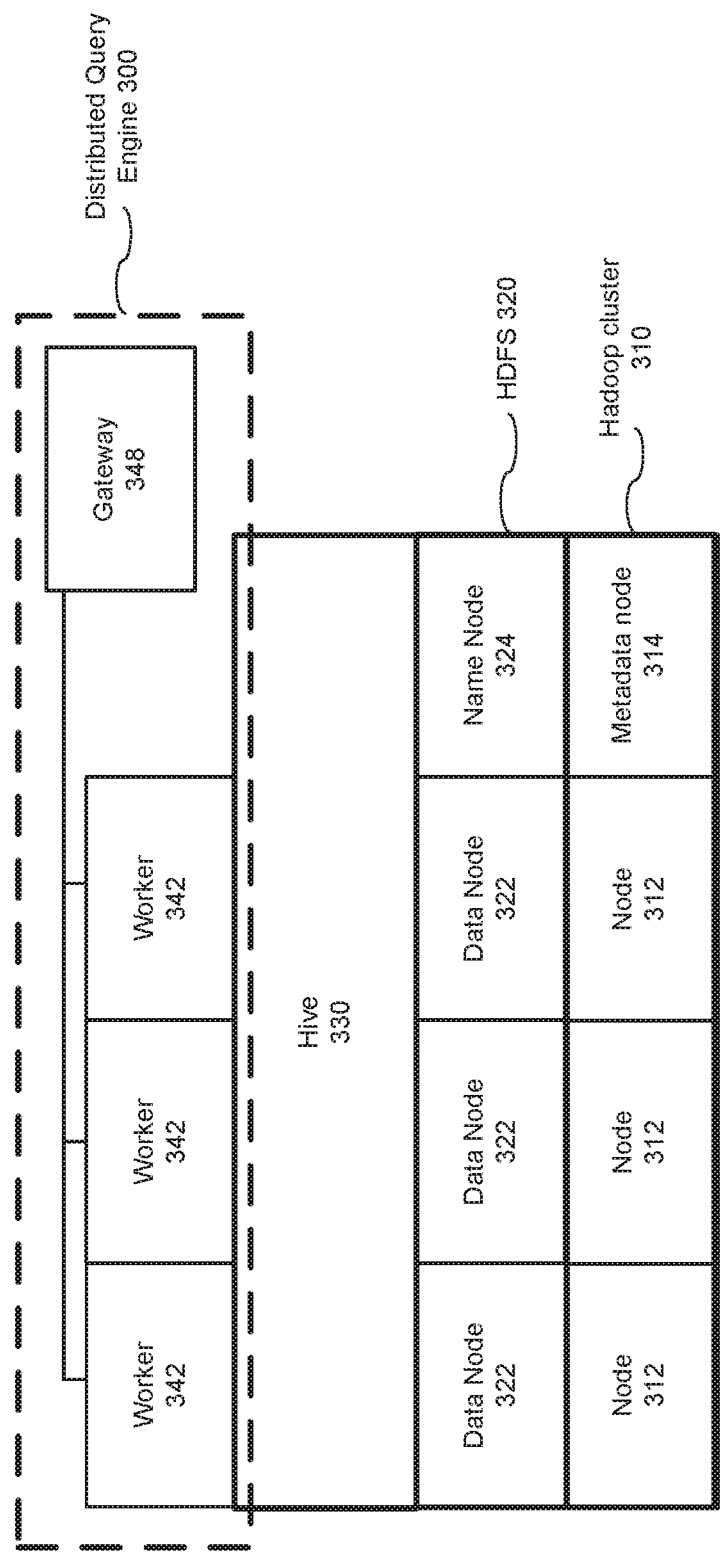
FIG. 3 illustrates relationships among a distributed query engine, a Hadoop Distributed File System (HDFS), a Hive data warehouse and a storage cluster.

In one embodiment, a distributed query engine is built on top of a Hadoop cluster running Hadoop Distributed File System (HDFS) and Hive data warehouse. FIG. 3 illustrates the relationships among the distributed query engine 300, the Hive data warehouse, the HDFS and the storage cluster. The distributed query engine 300 is built on top of the Hive data warehouse and the HDFS, which in turn rely on the storage cluster to operate. A Hadoop cluster 310 including a plurality of nodes 312 that are responsible for storing the massive amount of data. The Hadoop cluster 310 further includes a metadata node 314. A Hadoop Distributed File System (HDFS) 320 is running on the Hadoop cluster 310 to distribute and manage the data among the nodes 312. DataNode services 322 are running on the nodes 312 to manage the local data store in the nodes 312. Data and files are split into blocks that are stored in the nodes 312 of the Hadoop cluster 310. A NameNode service 324 is running on the metadata node 314 to provide metadata services within the Hadoop cluster, including maintaining the file system namespace and controlling access by external clients.

A Hive data warehouse system 330 is built on top of the Hadoop cluster 310 and the HDFS 320. The Hive data warehouse system 330 works as a database interface. The Hive data warehouse system 330 supports data queries expressed in an SQL-like declarative language, HiveQL. Instead of relying on the map-reduce scheme of the Hadoop cluster to process the database queries for the Hive system, the discontinued query engine includes a plurality of worker nodes 342 to process the database queries in a parallel fashion. The distributed query engine 300 further includes a gateway 348. In one embodiment, the worker nodes 342 are implemented as services running on the nodes 312 of the Hadoop cluster 310. In another embodiment, the worker nodes 342 are implemented as dedicated servers interconnected with the nodes 312 of the Hadoop cluster 310.

In some embodiments, the worker nodes 342 are responsible to compile the partial tasks expressed in HiveQL into instructions that the DataNode services 322 of the HDFS 320 can execute.

Figure 4:
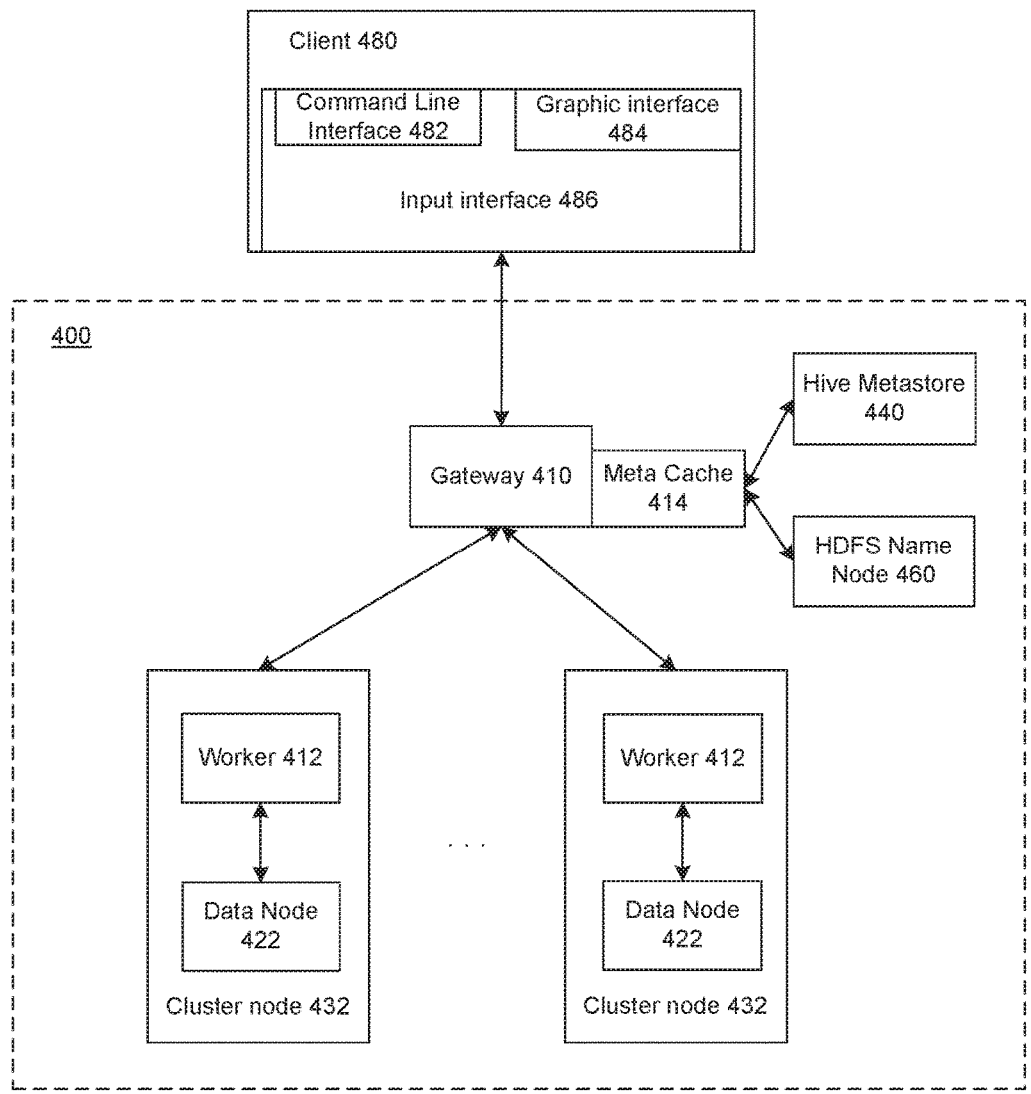
FIG. 4 illustrates a high level block diagram of an example distributed query engine.

The distributed query engine receives a query task from a client and splits the query task into multiple partial tasks. FIG. 4 illustrates a high level block diagram of an example distributed query engine 400. Operators of the distributed query engine 400 can provide query task via input interface 486 of a client 480. In one embodiment, the input interface 486 includes both command line interface 482 and graphic interface 484. Using the command line interface 482, an operator can provide the query task as a program directly expressed in a database query language, such as SQL or HiveQL. By using the graphic interface 484, an operator can provide the query task by working with the graphic interface elements of 484. In one embodiment, the graphic interface 484 is implemented as an input web page. An operator can provide the query task by interacting with elements on the input web page, selecting options, and entering input data. The graphic interface 484 can translates the operator's selections and inputs into a corresponding program expressed in a database query language. The input interface 486 transmits the program, received from either the command line interface 482 or graphic interface 484, to a gateway 410 of the distributed query engine 400 as the query task.

The gateway 410 receives the query task from the client 480 and parses the query task. The gateway 410 sends an inquiry to the Hive Metastore 440 based on the query task. The Hive Metastore 440 returns table metadata and HDFS file identifications to the gateway 410 for the data upon which the query task needs to run. Then the gateway 410 retrieves the locations of the corresponding HDFS blocks from the HDFS NameNode 460 based on the HDFS file identifications.

In one embodiment, the gateway 410 divides the query task into a plurality of partial queries based on the corresponding HDFS blocks. The gateway 410 assigns each individual partial query to be executed on one HDFS block within the corresponding HDFS blocks. In other embodiments, the gateway 410 can divide the query task into partial queries in other ways, as may be contemplated by a person of ordinary skill in the art.

The gateway 410 sends each of the partial queries to a worker 412 for local processing. In one embodiment, workers 412 are overlaid on the Hadoop cluster that stores the Hive table data. Each work 412 runs as a service on a Hadoop cluster node 432. The partial queries are generated such that each worker 412 is responsible for a partial query to process data store on the node 432 which that particular worker 412 runs. The worker 412 directly contacts a DataNode service 422 which runs on the same cluster node 432 as the worker 412. The worker 412 is able to achieve low-latency data reads for the partial query by requesting data within a single cluster node 432.

The cluster node 432 can use remote procedure call (RPC) frameworks to facilitate the implementation of the services. For example, in one embodiment, the cluster node 432 use an RPC framework such as Apache Thrift framework to define and create the worker service 412 as a highly scalable and high performance server service.

In one embodiment, the worker nodes 342 are implemented as services running on the nodes 312 of the Hadoop cluster 310. In another embodiment, the worker nodes 342 are implemented as dedicated servers interconnected with the nodes 312 of the Hadoop cluster 310.

The workers 412 periodically return status updates (referred to as "heartbeats") to the gateway 410 indicating the process of the partial query processing. In one embodiment, if there is an assigned worker which stops returning heartbeats or shows no progress, the gateway 410 determines that the worker has failed and reschedules the partial query to another worker. Each worker 412 scans data related to the respective partial query that stored on one or more cluster nodes 432, and generates an intermediate result for the partial query. In one embodiment, the worker 412 processes the partial query entirely in the memory of the cluster node on which the worker 412 runs. The worker 412 stores the intermediate result in its memory. At the end of the processing of the partial query, the worker 412 sends the intermediate result to the gateway 410. In some embodiments, the worker 412 sends the intermediate result via RPC calls such as Apache Thrift calls.

The gateway 410 receives all intermediate results from the workers 412 and combines the intermediate results into a query result as an answer for the query task. Then the gateway 410 returns the query result to the client 480. In one embodiment, the client 480 optionally displays the query result on a display component.

A MetaCache 414 runs on the gateway 410 to cache both the Hive table-level and the HDFS file-level metadata to decrease query latency. In some embodiments, the MetaCache 414 can be implemented as a standalone server interconnected with the gateway 410. The MetaCache 414 can keep the cached data from previous queries. For example, when an operator is interactively analyzing on data of a Hive table, the operator runs multiple consecutive queries on the same Hive table. By preserving the cached data from previous queries, the MetaCache 414 can reuse the cached metadata instead of fetching the metadata repetitively from the Hive Metastore 440 and the HDFS NameNode 460.

The MetaCache 414 has high cache hit rates because data in a typical Hive table is written once and read many times without further changes. In one embodiment, the MetaCache 414 can retrieve a real-time feed of audit logs of the Hive system to invalidate entries in the cached data for partitions in the Hive system that may have been changed by Hive queries or other operations. In another embodiment, the MetaCache 414 automatically purges entries in the cached data that have not been queried for a predetermined time period (e.g. one hour). In doing so, the MetaCache 414 prevents arbitrary growth in memory usage and minimizes cache errors.

The workload of each cluster node 432 on which a worker 412 runs can be different. Cluster nodes 432 and worker services 412 can also fail for various reasons. While the gateway 410 can receive intermediate results from a majority of workers 412 in a reasonable time period, there are workers 412 that fail to deliver the intermediate result due to the node or service failures or delays. These workers either report rates of progress below a predetermined percentage after a predetermined time period since the partial queries distribution, or simply fail to respond the progress to the gateway 410. These workers are identified as straggling workers. Once the gateway 410 identifies the straggling workers, the gateway 410 sends messages to the straggling workers to cancel assignment of the partial queries. For each unfinished partial query for which straggling workers failed to deliver the intermediate results, the gateway 410 further divides the partial query into a plurality of subordinate partial queries, and assigns the subordinate partial queries to some of the workers 412. In one embodiment, the gateway 410 determines the assignment of the subordinate partial queries based on the current workload of the workers 412. In other embodiments, the gateway 410 can determine the assignment in other ways, as may be contemplated by a person of ordinary skill in the art. This additional parallelized process speeds up the retries of the unfinished partial queries and thus decreases the query latency caused by straggling workers.

Figure 5:
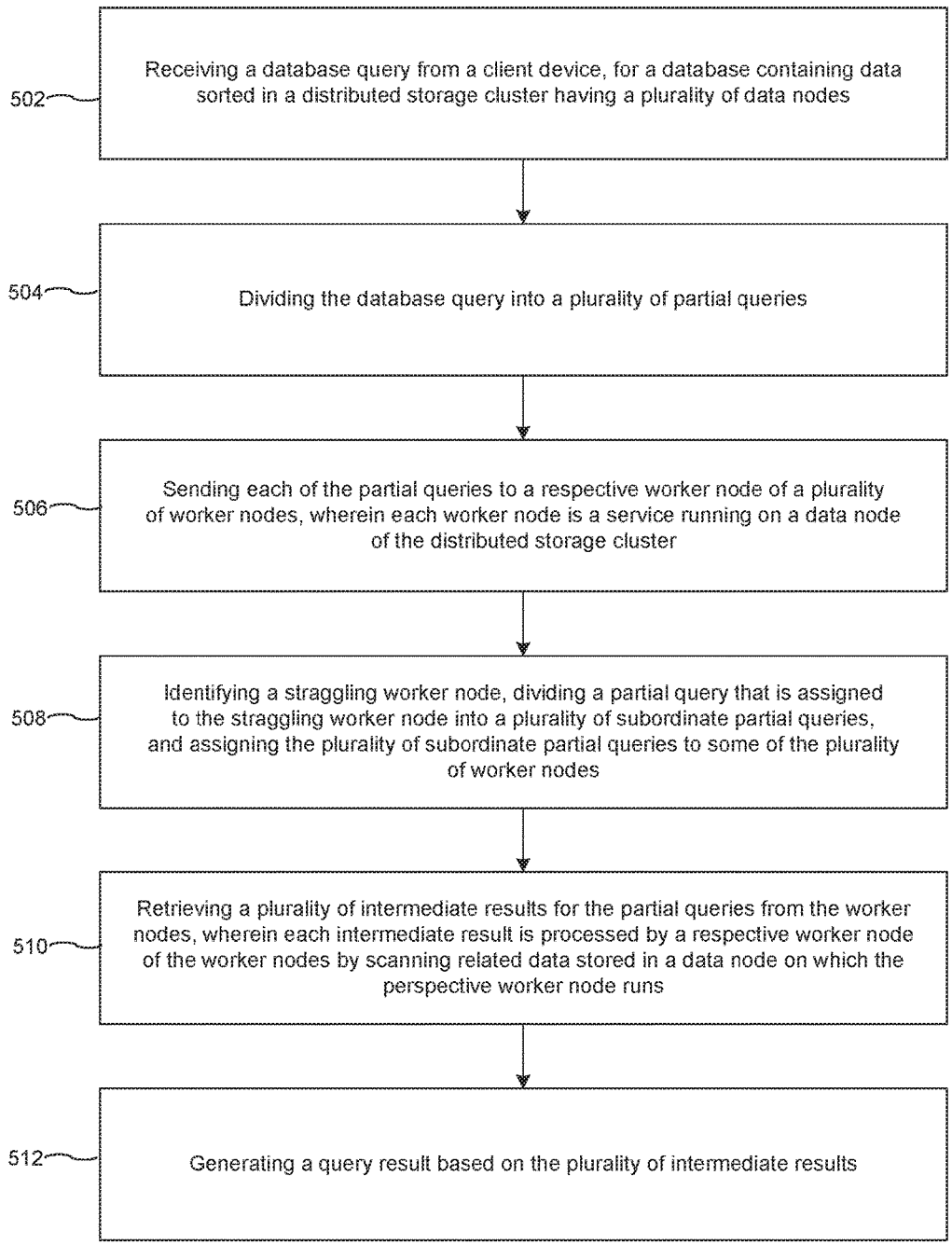
FIG. 5 illustrates a sample process for identifying straggling worker nodes and further dividing the partial queries.

FIG. 5 illustrates a sample process for identifying straggling worker nodes and further dividing the partial queries. At step 502, a gateway of the distributed query engine receives a database query from a client device, for a database containing data stored in a distributed storage cluster which has a plurality of data nodes. At step 504, the gateway divides the database query into a plurality of partial queries. Then at step 506, the gateway sends each of the partial queries to a respective worker node of a plurality of worker nodes. Each worker node can be a service running on a data node of the distributed storage cluster.

At step 508, the gateway server identifies a straggling worker node. The gateway further divides a partial query that is assigned to the straggling worker node into a plurality of subordinate partial queries, and assigns the plurality of subordinate partial queries to some of the plurality of worker nodes. In one embodiment, the gateway identifies a straggling worker node by monitoring heartbeat messages that the worker nodes periodically sends. The straggling worker node is identified when heartbeat messages from the straggling worker node are not received for a predetermined time period. In another embodiment, the straggling worker node is identified when a heartbeat message from the straggling worker node is received; where the heartbeat message includes a number representing the status of a partial query processing by the straggling worker node that is below a threshold value.

At step 510, the gateway retrieves a plurality of intermediate results for the partial queries from the worker nodes. Each intermediate result is processed by a respective worker node of the worker nodes by scanning related data stored in a data node on which the perspective worker node runs. At step 512, the gateway generates a query result based on the plurality of intermediate results.

In one embodiment, the distributed query engine can be compatible with Hive system's data formats and metadata, and can support a subset or an entire set of HiveQL language. And HiveQL is a declarative language similar to SQL. HiveQL does not need to strictly follow the standard of SQL, and offers extensions not originally specified in SQL. For example, the distributed query engine can support filters, aggregates, top-k, percentiles, sub-queries in FROM clauses, UNION ALL and user-defined functions.

In one embodiment, the distributed query engine support TABLESAMPLE clause can be used to explicitly limit the amount of input data that is scanned. In another embodiment, the distributed query engine support WITH clause allows operators to write more readable queries by declaring variables for complex expressions that are used multiple times in the same query. The WITH clause can also provide a way for the operator to specify hints to the optimizer such that it evaluates common sub-expressions only once during run time.

In some embodiments, the distributed query engine can supply an approximate query result before the entire query processing is finished. The distributed query engine can automatically supply the approximate query result after a predetermined time period since the initial query input, or when the processing of the query satisfies a predetermined condition (e.g. a certain number of workers fail). The distributed query engine can also supply the approximate query result in response to an operator instruction. For example, an operator waiting for the query result can input Ctrl-C to instruct the distributed query engine to stop the query processing. Upon receiving the instruction, the distributed query engine stops the query processing and returns an approximate query result. In one embodiment, the distributed query engine further supplies a percentage indicator to indicate the percentage of data scanned for the approximate query result. In one embodiment, the distributed query engine returns the approximate query result and continues the query processing for an exact query result (i.e. with a percentage indicator of 100%).

Particularly for queries to explore data instead of write or change data, approximate query results can be sufficient for the operator's analysis. Run time errors like node failures, corrupted input data, or even a user killing their queries can be treated as situations where all input data was not scanned. When there is a failure, the distributed query engine can instantly return an approximate query result based on the processing of the partial queries so far, instead of simply returning an error message. In one embodiment, the distributed query engine returns the approximate query result along with a percentage indicator.

In another embodiment, an operator can also specify in his query task that an exact query result is required. In these cases, a run time error can be returned if the query processing fails.

The distributed query engine uses one-pass algorithms for aggregations and stores all intermediate results in memory. The sizes of the intermediate results and the final query result can be relatively small. The distributed query engine's ability of returning an approximate query result can further reduces the size. For example, if the query is to sort data records by a specified column (e.g. ORDER BY clause), the distributed query engine can generate approximate answer by letting workers only scan a portion of the related data records. Similarly, the distributed query engine can also generate approximate answers for types of queries such as counting distinct entries and calculating percentile.

For example, in one embodiment, an operator of the distributed query engine can input a query task instructing a count of the number of distinct values of a country column from a specific set of data records. The distributed query engine receives the query, divides the query into partial queries, and assigns workers to process these partial queries. After 20 seconds from the time the distributed query engine starts the task, the operator terminates the task by pressing CTRL-C on a keyboard of a client device. Upon receiving the termination instruction, the distributed query engine immediately instructs the assigned workers to return approximate intermediate results and in turn returns an approximate result by combining these approximate intermediate results. The approximate result is returned to a client device of the operator. The client device can further receive information about the total processing time, number of workers used, rows of the data records that have been scanned, amount of data scanned, amount of data to be scanned for exact result, percentage of data scanned, and/or number of failures.

In another embodiment, the distributed query engine can automatically return an approximate query result after the number of failures exceeding a predetermined threshold value. In yet another embodiment, the operator specifies in the query task that an exact result is required. The distributed query engine will keep processing until all related data records are scanned by assigned workers. An exact query result can be returned to a user device of the operator. The client device can further receive information about the total processing time, number of workers used, rows of the data records that have been scanned, amount of data scanned, percentage of data scanned (i.e. 100%), and/or number of failures.

Figure 6:
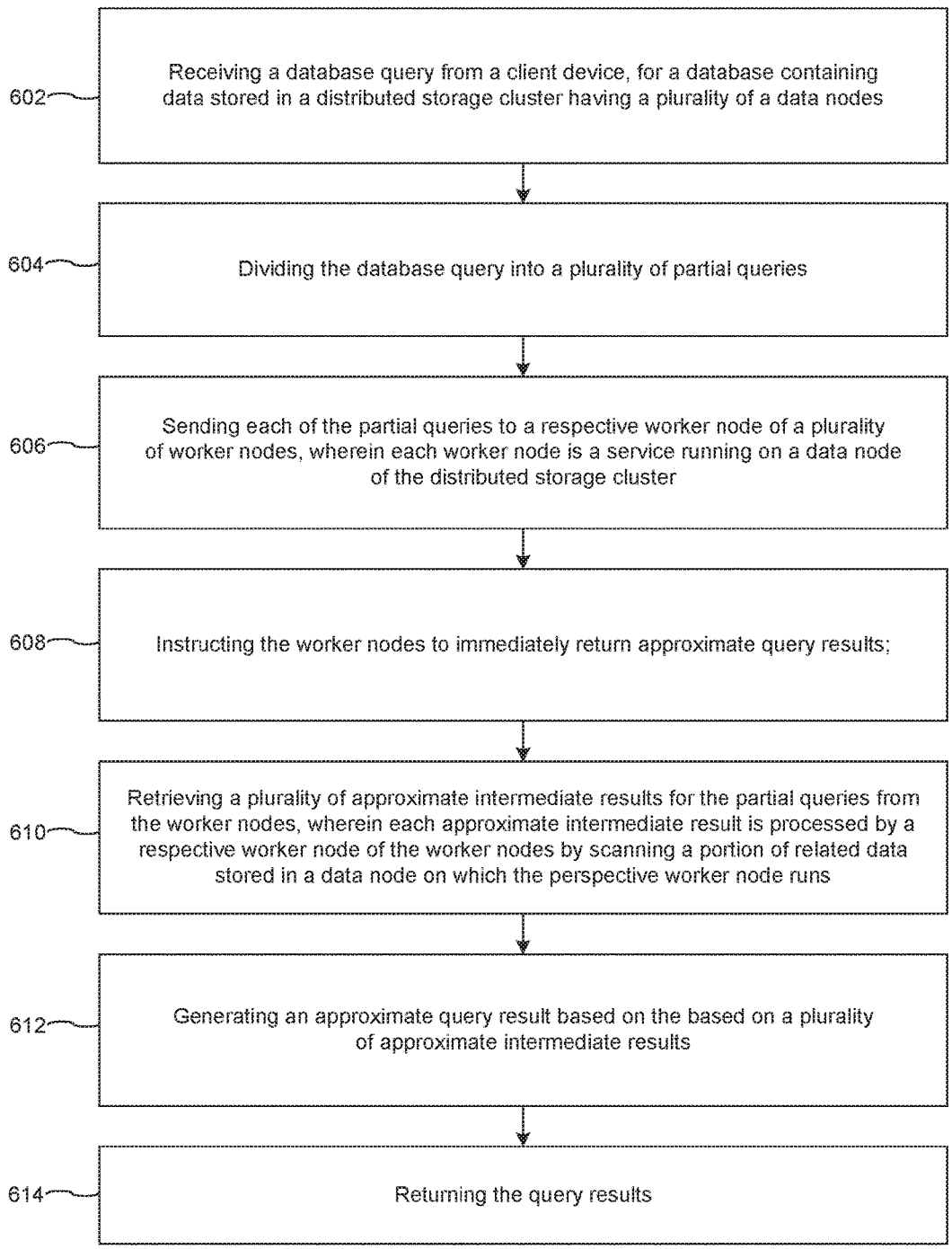
FIG. 6 illustrates a sample process for approximate processing of a database query.

FIG. 6 illustrates a sample process for approximate processing of a database query. At step 602, a gateway of the distributed query engine receives a database query from a client device, for a database containing data stored in a distributed storage cluster which has a plurality of data nodes. At step 604, the gateway divides the database query into a plurality of partial queries. Then at step 606, the gateway sends each of the partial queries to a respective worker node of a plurality of worker nodes. Each worker node can be a service running on a data node of the distributed storage cluster. At step 608, after sending the partial queries, the gateway can instruct the worker nodes to immediately return approximate query results. In one embodiment, immediately returning approximate query results means returning the results within a very short time period such as one second. The instruction can be triggered by various events. For example, the gateway may receive an instruction from the client device to terminate the processing of the database query; or the gateway may decide to return an approximate query result automatically when an exact query result is not available after a predetermined time period. Therefore, the approximate result can be requested manually by the client device, or automatically triggered by the distributed query engine without user intervention.

At step 610, after the instruction for approximate intermediate results, the gateway retrieves a plurality of approximate intermediate results for the partial queries from the worker nodes. Each approximate intermediate result is processed by a respective worker node of the worker nodes by scanning a portion of related data stored in a data node on which the perspective worker node runs. Upon receiving the approximate intermediate results, at step 612, the gateway generates an approximate query result based on a plurality of approximate intermediate results. Then at step 614, the gateway of the distributed query engine returns the approximate query result. In one embodiment, the approximate query result is returned along with a percentage indicator to the client device. The percentage indicator suggests the percentage of related data stored in the data nodes that has been scanned for the query result.

In addition to the above illustrated advantages, the techniques presented herein present additional advantages as discussed below.

The distributed query engine significantly reduces the latencies of queries on data stored in data storage clusters such as a Hadoop cluster, as compared to the query latencies by using a Hive system alone. Operators or users of the distributed query engine can conduct ad hoc queries with small waiting time periods. The distributed query engine can be utilized in different situations. For example, without the distributed query engine, the operators or analysts need to explicitly load data from Hive into a database such as MySQL or Oracle and then fetch data from the database to drive web-based data analysis reports. Using the distributed query engine, the operators can fetch data directly from the Hive system to generate the web-based data analysis report.

In one embodiment, when an operator is authoring a query task using, for example, the graphic interface 484 shown in FIG. 4, the distributed query engine can fetch data samples to show the operator a preview of the data on the graphic interface 484. In another embodiment, the distributed query engine can index and pin popular data sets in memory to further improve query latencies.

The techniques presented herein provide a low latency distributed query engine that can be built on top of a data storage cluster. The distributed query engine can be compatible with existing data and metadata of a Hive system. The distributed query engine can be used to drive data analysis reports without the need for pipelines that load data into other databases (e.g. MySQL or Oracle) for ad-hoc analysis.

Figure 7:
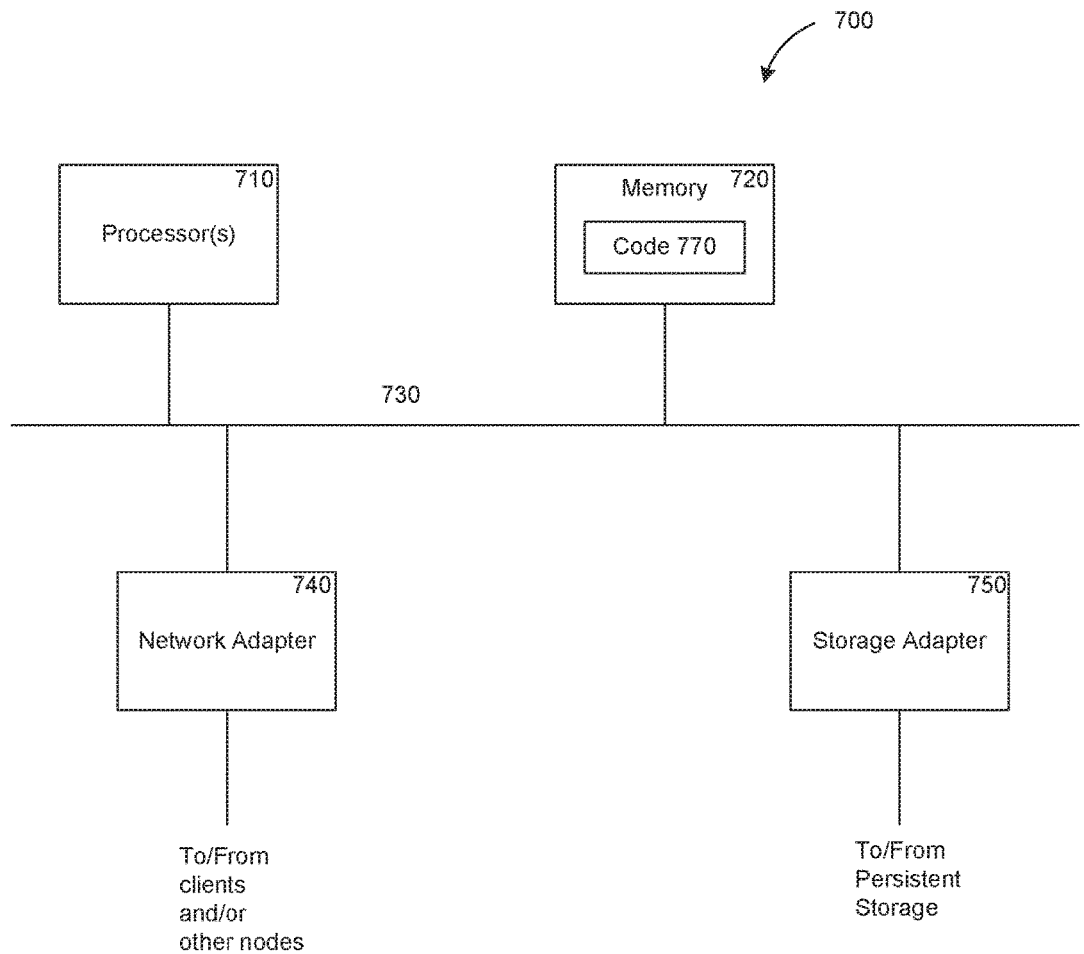
FIG. 7 is a high-level block diagram showing an example of the architecture of a computer node, which may represent any cluster node described herein.

FIG. 7 is a high-level block diagram showing an example of the architecture of a computer node, which may represent any cluster node described herein. The node 700 includes one or more processors 710 and memory 720 coupled to an interconnect 730. The interconnect 730 shown in FIG. 7 is an abstraction that represents any one or more separate physical buses, point to point connections, or both connected by appropriate bridges, adapters, or controllers. The interconnect 730, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 710 is/are the central processing unit (CPU) of the storage controller 700 and, thus, control the overall operation of the node 700. In certain embodiments, the processor(s) 710 accomplish this by executing software or firmware stored in memory 720. The processor(s) 710 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 720 is or includes the main memory of the node 700. The memory 720 represents any form of random access memory (RAM), read-only memory (ROM), flash memory, or the like, or a combination of such devices. In use, the memory 720 may contain a code 770 containing instructions according to the techniques disclosed herein.

Also connected to the processor(s) 710 through the interconnect 730 are a network adapter 740 and a storage adapter 750. The network adapter 740 provides the node 700 with the ability to communicate with remote devices, over a network and may be, for example, an Ethernet adapter or Fibre Channel adapter. The network adapter 740 may also provide the node 700 with the ability to communicate with other nodes within the cluster. In some embodiments, a node may use more than one network adapter to deal with the communications within and outside of the cluster separately. The storage adapter 750 allows the node 700 to access a persistent storage, and may be, for example, a Fibre Channel adapter or SCSI adapter.

The code 770 stored in memory 720 may be implemented as software and/or firmware to program the processor(s) 710 to carry out actions described above. In certain embodiments, such software or firmware may be initially provided to the node 700 by downloading it from a remote system through the node 700 (e.g., via network adapter 740).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:
1. A system, comprising:
   a gateway server configured to generate a plurality of partial queries from a database query for a database containing data stored in a distributed storage cluster that has a plurality of data nodes, and to construct a query result based on a plurality of intermediate results; and a plurality of worker nodes, the worker nodes being separate from the data nodes, wherein each worker node of the plurality of worker nodes is configured to process a respective partial query of the plurality of partial queries by scanning data related to the respective partial query and stored on at least one data node of the distributed storage cluster, and wherein each worker node of the plurality of worker nodes is further configured to generate an intermediate result of the plurality of intermediate results that is stored in a memory of that worker node, wherein at least one of the worker nodes is further configured to divide the respective partial query into subordinate partial queries based on quantity and location information of input file blocks of the query.

2. The system of claim 1, wherein each worker node of the plurality of worker nodes is further configured to process the respective partial query of the plurality of partial queries by scanning a portion of the data related to the respective partial query that is stored on the at least one data node of the distributed storage cluster and to generate an approximate intermediate result that is stored in the memory of that worker node.

3. The system of claim 2, wherein the gateway server is further configured to construct an approximate query result based on at least one approximate intermediate result.

4. The system of claim 1, wherein the gateway server is further configured to construct an approximate query result based on a portion of the plurality of intermediate results.

5. The system of claim 1, wherein the gateway server is further configured to identify a straggling worker node, further divide a partial query that is assigned to the straggling worker node into a plurality of subordinate partial queries, and assign the plurality of subordinate partial queries to some of the plurality of worker nodes, wherein the straggling worker node is a worker node that either fails to report a rate of progress to the gateway server or reports the rate of progress below a specified value after a specified time period to the gateway server.

6. The system of claim 1, wherein each worker node of the plurality of the worker nodes is a service running a respective data node within the distributed storage cluster.

7. The system of claim 1, further comprising:
a metadata cache configured to cache table level metadata of the database and file level metadata of the distributed storage cluster.

8. The system of claim 7, wherein the metadata cache is configured to retain cached metadata from a previous database query for the database query.

9. The system of claim 1, wherein each worker node of the plurality of the worker nodes periodically sends heartbeat messages to the gateway server to report status of a partial query processing by that worker node.

10. The system of claim 1, wherein the gateway server is further configured to receive an instruction from a client device to return an approximate query result or terminate a processing of the database query.

11. The system of claim 1, wherein the gateway server is further configured to instruct the worker nodes to immediately return approximate intermediate results, and to return an approximate query result based on the approximate intermediate results to a client device.

12. The system of claim 1, wherein the database query includes a request for an approximate query result.

13. The system of claim 1, wherein the query result is accompanied by an indication of a portion of related data stored in the data nodes that has been scanned for the query result.

14. The system of claim 1, wherein the database is a Hive data warehouse system and the distributed storage cluster is a Hadoop cluster.

15. A method, comprising:
receiving a database query from a client device, for a database containing data stored in a distributed storage cluster having a plurality of cluster nodes; dividing the database query into a plurality of partial queries; sending each of the partial queries to a respective worker node of a plurality of worker nodes, wherein each worker node is a service running on a memory of a cluster node of the distributed storage cluster;
identifying a straggling worker node, dividing a partial query that is assigned to the straggling worker node into a plurality of subordinate partial queries based on quantity and location information of input file blocks of the query, and assigning the plurality of subordinate partial queries to some of the plurality of worker nodes;
retrieving a plurality of intermediate results for the partial queries from the worker nodes, wherein each intermediate result is processed by a respective worker node of the worker nodes by scanning related data stored in a cluster node on which the perspective worker node runs; and
generating a query result based on the plurality of intermediate results.

16. The method of claim 15, wherein the step of identifying comprises:
identifying a straggling worker node by monitoring heartbeat messages that the worker nodes periodically send, wherein the straggling worker node is identified when heartbeat messages from the straggling worker node are not received for a predetermined time period, or when a heartbeat message from the straggling worker node is received and the heartbeat message including a number representing a status of a partial query processing by the straggling worker node that is below a threshold value.

17. The method of claim 15, further comprising:
caching data associated with previous database queries for the database in a cache;
retrieving a real-time feed of audit logs of the database to invalidate entries in the cached data stored in the cache that have been changed by the previous database queries; and
purging entries in the cached data from the cache that have not been queried for a specified time period.

18. A method, comprising:
receiving a database query from a client device, for a database containing data stored in a distributed storage cluster having a plurality of cluster nodes; dividing the database query into a plurality of partial queries; sending each of the partial queries to a respective worker node of a plurality of worker nodes, wherein each worker node is a service running on a memory of a cluster node of the distributed storage cluster;
identifying a straggling worker node, dividing a partial query that is assigned to the straggling worker node into a plurality of subordinate partial queries, and assigning the plurality of subordinate partial queries to some of the plurality of worker nodes;
retrieving a plurality of intermediate results for the partial queries from the worker nodes, wherein each intermediate result is processed by a respective worker node of the worker nodes by scanning related data stored in a cluster node on which the perspective worker node runs;

generating a query result based on the plurality of intermediate results;

caching data associated with previous database queries for the database in a cache;

retrieving a real-time feed of audit logs of the database to invalidate entries in the cached data stored in the cache that have been changed by the previous database queries; and purging entries in the cached data from the cache that have not been queried for a specified time period.

* * * * *